(12) United States Patent
Shimizu et al.

(10) Patent No.: US 6,868,936 B2
(45) Date of Patent: Mar. 22, 2005

(54) ELECTRIC POWER STEERING APPARATUS

(75) Inventors: Yasuo Shimizu, Wako (JP); Katsuji Watanabe, Wako (JP); Atsuhiko Yoneda, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 20 days.

(21) Appl. No.: 10/397,489

(22) Filed: Mar. 26, 2003

(65) Prior Publication Data

US 2003/0188918 A1 Oct. 9, 2003

(30) Foreign Application Priority Data

Apr. 3, 2002 (JP) ....................................... 2002-101480

(51) Int. Cl.[7] .............................................. D62D 5/04
(52) U.S. Cl. ........................ 180/444; 180/446; 701/41
(58) Field of Search ............................. 180/402, 444, 180/446, 443; 701/41

(56) References Cited

U.S. PATENT DOCUMENTS

| | | | | | |
|---|---|---|---|---|---|
| 3,580,352 A | * | 5/1971 | Hestad et al. | ............... | 180/402 |
| 4,719,396 A | * | 1/1988 | Shimizu | ..................... | 318/432 |
| 4,735,271 A | * | 4/1988 | Shimizu | ..................... | 180/446 |
| 4,754,829 A | * | 7/1988 | Shimizu | ..................... | 180/446 |
| 4,771,845 A | * | 9/1988 | Shimizu | ..................... | 180/446 |
| 4,819,170 A | * | 4/1989 | Shimizu | ..................... | 701/41 |
| 4,837,692 A | * | 6/1989 | Shimizu | ..................... | 701/41 |
| 6,691,819 B2 | * | 2/2004 | Menjak et al. | ............. | 180/446 |
| 2003/0221896 A1 | * | 12/2003 | Sasaki et al. | ............... | 180/444 |

FOREIGN PATENT DOCUMENTS

JP         7-94226       10/1995

* cited by examiner

*Primary Examiner*—Lesley D. Morris
*Assistant Examiner*—Daniel Yeagley
(74) *Attorney, Agent, or Firm*—Merchant & Gould P.C.

(57) ABSTRACT

An improvement to an electric power steering apparatus which applies an assisting torque produced by an electric motor in correspondence with a steering torque to a rack shaft by way of a belt type transmission mechanism. A driving pulley of the belt type transmission mechanism is mounted to an output shaft part of the motor shaft of the electric motor. This output shaft part is rotatably supported at locations on both sides of the driving pulley.

3 Claims, 6 Drawing Sheets

ELECTRIC POWER STEERING APPARATUS

FIELD OF THE INVENTION

This invention relates to improvements to an electric power steering apparatus for use in an automotive vehicle.

BACKGROUND OF THE INVENTION

In recent years, to lighten the steering force that has to be applied to a steering wheel and to provide a comfortable steering feel, electric power steering systems have been widely used in automotive vehicles. An electric power steering apparatus produces an assisting torque corresponding to a steering torque with an electric motor, applies this assisting torque to an output shaft or rack shaft of a steering mechanism, and steers steering road wheels with this output shaft or rack shaft.

Constructions for applying the assisting torque include those of a type wherein the assisting torque produced by the electric motor is transmitted to the output shaft or rack shaft by way of a belt type transmission mechanism. When this kind of belt type transmission mechanism is employed, the freedom of disposition of the electric motor is high. An example of a known electric power steering apparatus of this kind is the "ELCTRIC POWER STEERING APPARATUS" disclosed in Japanese Patent Publication No. HEI-7-94226.

This power steering apparatus has a construction wherein an output shaft is joined to an input shaft by a torsion bar and a steering torque applied to a steering wheel is transmitted to steering road wheels through the input shaft, the torsion bar, the output shaft and knuckles.

An angle of relative twist between the input shaft and the output shaft connected by the torsion bar is detected electrically with a steering torque sensor to detect the steering torque. A belt is passed around a small pulley mounted on the shaft of an electric motor and a large pulley mounted on the output shaft, and an assisting torque produced by the electric motor in correspondence with the steering torque is applied to the output shaft via the small pulley, the belt and the large pulley.

In this electric power steering apparatus of related art, the tensile force acting on the belt fluctuates with fluctuations in the assisting torque, and the bending load acting on the motor shaft of the electric motor from the small pulley also fluctuates. The motor shaft is a shaft extending outward from a motor case, and has the same bending rigidity as a "cantilever" or "overhang". When the motor shaft is subjected to a large bending load and bends, because the belt leans to one side on the small pulley, the torque transmission efficiency tends to fall. Consequently, when the fluctuation of the assisting torque is large, irregularities occur in the assisting torque applied from the electric motor to the output shaft, and this is undesirable from the point of view of improving steering feel.

Also, in this related art power steering apparatus, by the amount through which the torsion bar twists in correspondence with the steering torque, a relative angular displacement arises between the input shaft and the output shaft. Consequently, the operation timing of the steering road wheels lags slightly behind the steering timing of the steering wheel. Furthermore, because the relative twist angle between the input shaft and the output shaft connected by the torsion bar is detected by a steering torque sensor, the detection timing also lags slightly, and the timing at which the electric motor produces the assisting torque lags.

Normally, the rotor and motor shaft of the electric motor have their own inherent inertia. Because the belt has to be flexible, generally its rigidity is small compared to metal transmission members such as steel gears, and it has an inherent spring constant. That is, the motor shaft of an electric motor having inertia is connected to an output shaft having a relatively large mass by a belt having an inherent spring constant. Consequently, the transmission timing of the assisting torque produced by the electric motor may lag slightly by the time it reaches the output shaft.

When the transmission timing lags like this, i.e. when a time lag occurs, it has a subtle influence on the steering feel.

Accordingly, in an electric power steering apparatus which apply an assisting torque produced by an electric motor to a steering mechanism by way of a belt type transmission mechanism, there has been a need for steering feel to be improved.

SUMMARY OF THE INVENTION

The present invention provides an electric power steering apparatus for use in an automotive vehicle, including: a steering wheel; an electric motor for producing an assisting torque corresponding to a steering torque produced with the steering wheel; a belt type transmission mechanism for transmitting the assisting torque to a steering mechanism; and a driving pulley of the belt type transmission mechanism, fixed to the motor shaft of the electric motor, wherein the motor shaft is rotatably supported at positions on both sides of the driving pulley.

Preferably, the distal end of the motor shaft, to which the driving pulley is fixed, is supported by a bearing in a distal end part of a bracket fixed to the electric motor.

As a result of the motor shaft of the electric motor being rotatably supported on both sides of the driving pulley, the motor shaft has a bending rigidity equal to a "straddle-mounted" shaft. That is, by making the motor shaft straddle-mounted, it is possible to make its bending rigidity much higher than that of a cantilever type motor shaft of related art. As a result, even when the motor shaft is subjected to a large bending load, the amount of bending of the motor shaft is greatly reduced. By bending being suppressed, leaning of the belt on the driving pulley is suppressed and the torque transmission efficiency is raised. Because of this, even when the fluctuation of the assisting torque is large, irregularities do not readily arise in the assisting torque applied to the steering mechanism from the electric motor by way of the belt transmission mechanism. Accordingly, the steering feel of the electric power steering apparatus can be improved.

Also, the invention provides an electric power steering apparatus for use in an automotive vehicle including: a steering wheel; a rack and pinion mechanism to the pinion shaft of which is transmitted a steering torque produced by operating the steering wheel to steer steering road wheels; a torque detection device for detecting the steering torque; an electric motor for producing an assisting torque corresponding to the steering torque; and a belt type transmission mechanism interposed between the electric motor and the rack and pinion mechanism for applying the assisting torque to the rack shaft of the rack and pinion mechanism, wherein the torque detection device detects and converts into a steering torque an amount of twist of the pinion shaft which changes in correspondence with the steering torque.

According to this aspect of the invention, because an amount of twist in the pinion shaft which changes in correspondence with the steering torque is detected and converted to a steering torque by a torque detection device, the pinion shaft can be made a single shaft not divided into an input shaft and an output shaft. When the pinion shaft is made a single shaft like this, the amount of twist which occurs when a steering torque acts on it is extremely small. Consequently, the lag of the operation timing of the steering road wheels behind the steering timing of the steering wheel can be greatly suppressed. Furthermore, because an extremely small amount of twist is detected by the torque detection device, it can be detected rapidly. As a result, the assisting torque from the electric motor can be produced swiftly.

Accordingly, as the time lag of the whole electric power steering apparatus from when the steering wheel is turned to when the steering road wheels are turned, it is only necessary to consider the time lag at which the assisting torque produced by the electric motor is applied to the rack shaft via the belt type transmission mechanism. Therefore, the responsiveness of an electric power steering apparatus for providing an assisting torque corresponding to a steering torque can be raised. Consequently, the steering feel can be improved further.

As the torque detection device, preferably a magnetostriction type detection device which electrically detects magnetostriction occurring in correspondence with an amount of twist in the pinion shaft is used.

Even when the amount of twist in the pinion shaft is small, magnetostriction changing in correspondence with the amount of twist can be detected rapidly and certainly by the magnetostriction detection device. Therefore, the responsiveness of the electric power steering apparatus for providing an assisting torque corresponding to a steering torque can be raised still further. Consequently, the steering feel can be still better improved.

BRIEF DESCRIPTION OF THE DRAWINGS

A presently preferred embodiment of the invention will now be described in detail on the basis of the accompanying drawings, in which.

DETAILED DESCRIPTION OF THE PREFERRED EMBODIMENTS

Figure 1:
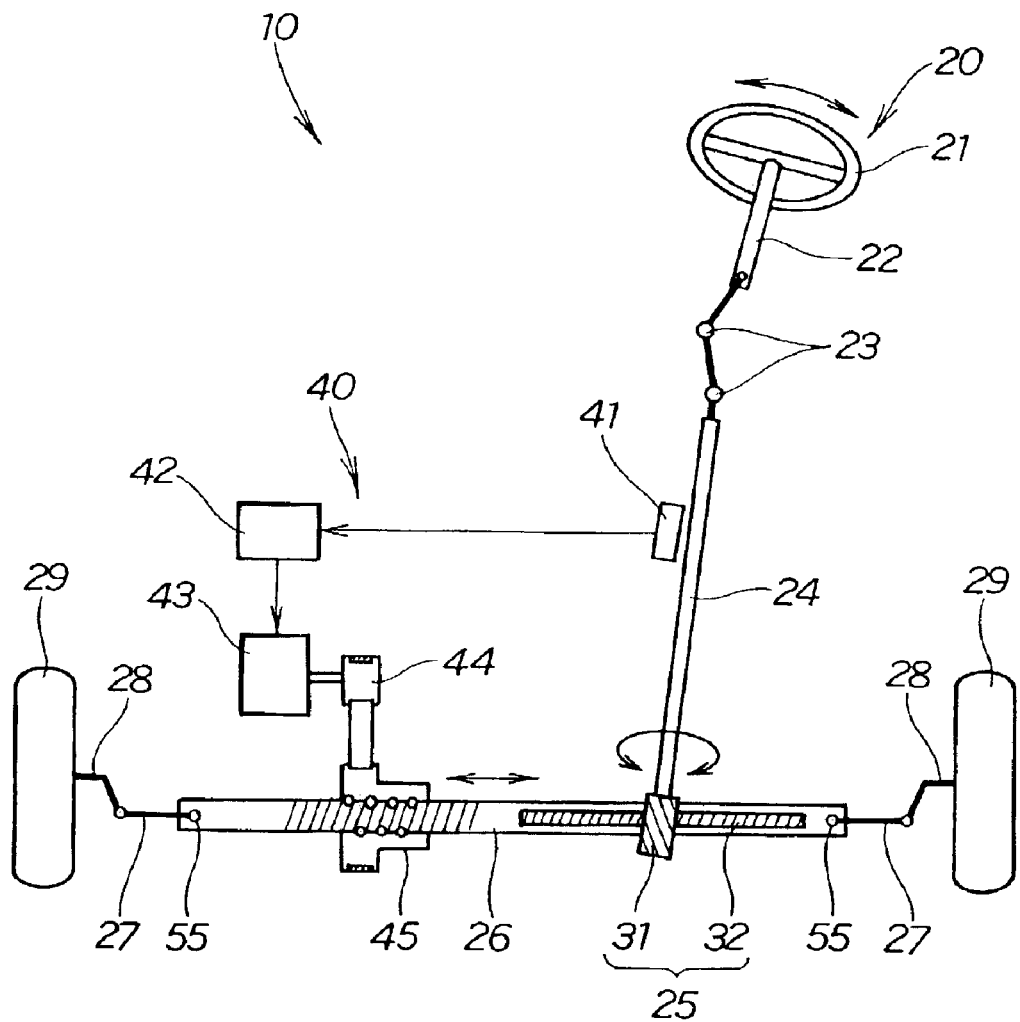
FIG. 1 is a schematic view of an electric power steering apparatus according to the invention.

An electric power steering apparatus 10 shown in FIG. 1 is made up of a steering mechanism 20 extending from a vehicle steering wheel 21 to steering road wheels 29, 29, and an assisting torque mechanism 40 for applying an assisting torque to the steering mechanism 20. This electric power steering apparatus 10 is an end take-off type steering apparatus, wherein a steering torque is taken out from both ends of a rack shaft 26.

The steering mechanism 20 has a pinion shaft 24 connected to the steering wheel 21 by a steering shaft 22 and universal couplings 23, 23; the rack shaft 26, which is connected to the pinion shaft 24 by a rack and pinion mechanism 25; and the left and right steering road wheels 29, 29, which are connected to the ends of the rack shaft 26 by left and right tie rods 27, 27 and knuckles 28, 28.

The rack and pinion mechanism 25 is made up of a pinion 31 formed on the pinion shaft 24 and a rack 32 formed on the rack shaft 26.

A driver steers the left and right steering road wheels 29, 29 by way of the rack and pinion mechanism 25 and the left and right tie rods 27, 27 with a steering torque produced by turning the steering wheel 21.

The assisting torque mechanism 40 detects the steering torque of the steering mechanism 20 applied to the steering wheel 21 with a torque detecting device 41; on the basis of this detection signal produces a control signal with a control part 42; on the basis of this control signal produces an assisting torque corresponding to the steering torque with an electric motor 43; and transmits the assisting torque to the rack shaft 26 by way of a belt type transmission mechanism 44 and a ball screw 45 serving as torque transmitting members.

In this way, the electric power steering apparatus 10 of this invention transmits a steering torque applied to the vehicle steering wheel 21 to the rack shaft 26 by way of the rack and pinion mechanism 25; applies an assisting torque produced by the electric motor 43 in correspondence with the steering torque to the rack shaft 26 by way of the belt type transmission mechanism 44 and the ball screw 45; and steers the steering road wheels 29, 29 with this rack shaft 26. That is, the steering road wheels 29, 29 are steered with a compound torque obtained by adding an assisting torque from the electric motor 43 to the steering torque of the steering mechanism 20.

Figure 2:
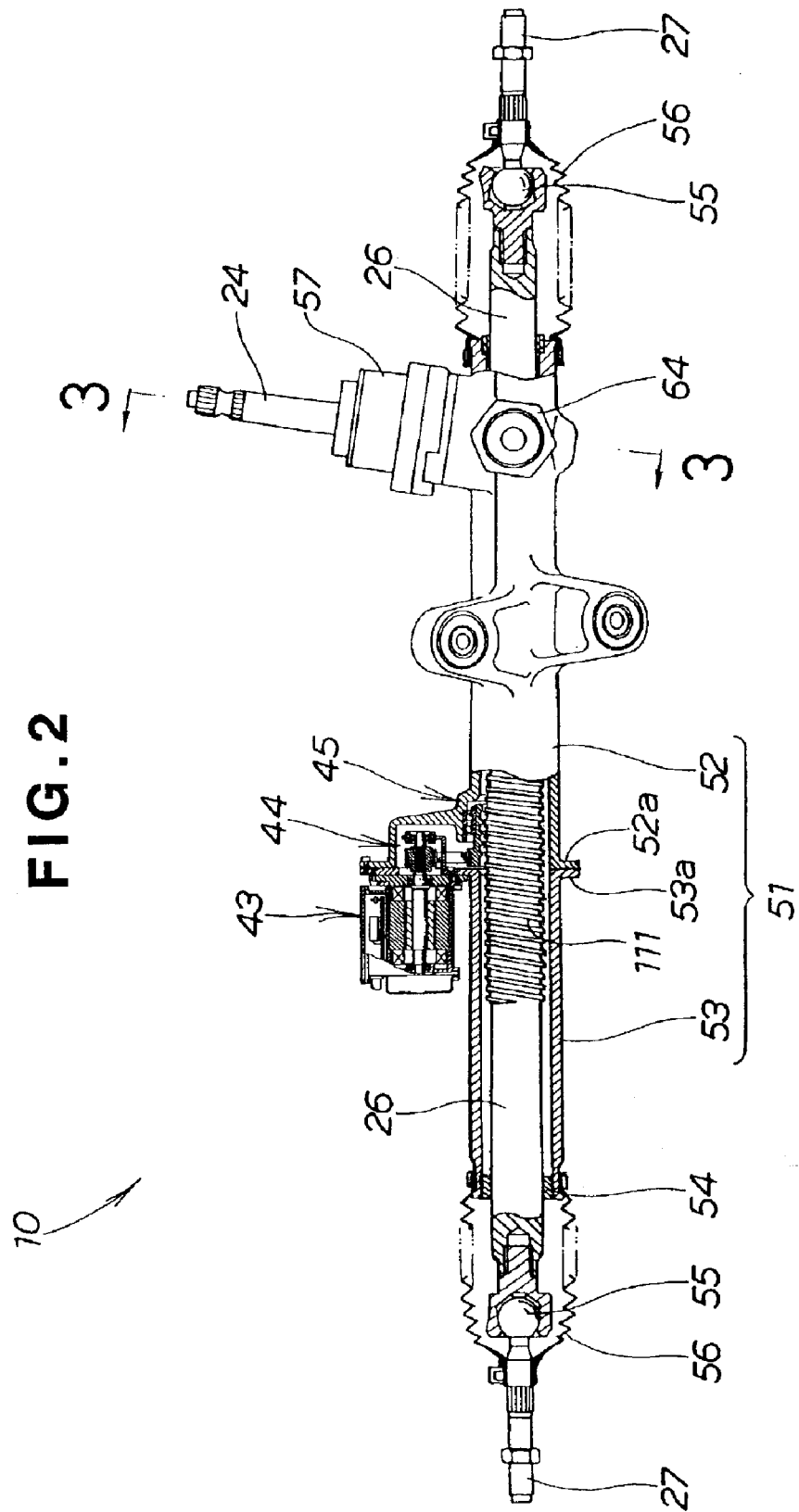
FIG. 2 is an overall construction view of the electric power steering apparatus shown in FIG. 1.

FIG. 2 shows the overall construction of the power steering apparatus shown in FIG. 1. The rack and pinion mechanism 25 and the ball screw 45 shown in FIG. 1 are received in a housing 51. The electric motor 43 is mounted on the outside of the housing 51.

The housing 51 is a long, narrow gearbox assembled by joining together with bolts the end faces of a first housing 52 and a second housing 53, which are roughly pipe-shaped, and extends in the width direction of the vehicle.

The rack shaft 26, which extends in the width direction of the vehicle, is a shaft passing through the housing 51 slidably in the width direction of the vehicle, and has the ball screw 45 in a substantially central position in its length direction.

In the figure, the reference numeral 54 denotes a rack shaft support bearing; 55, 55 are ball joints; and 56, 56 are dust-sealing boots.

Figure 3:
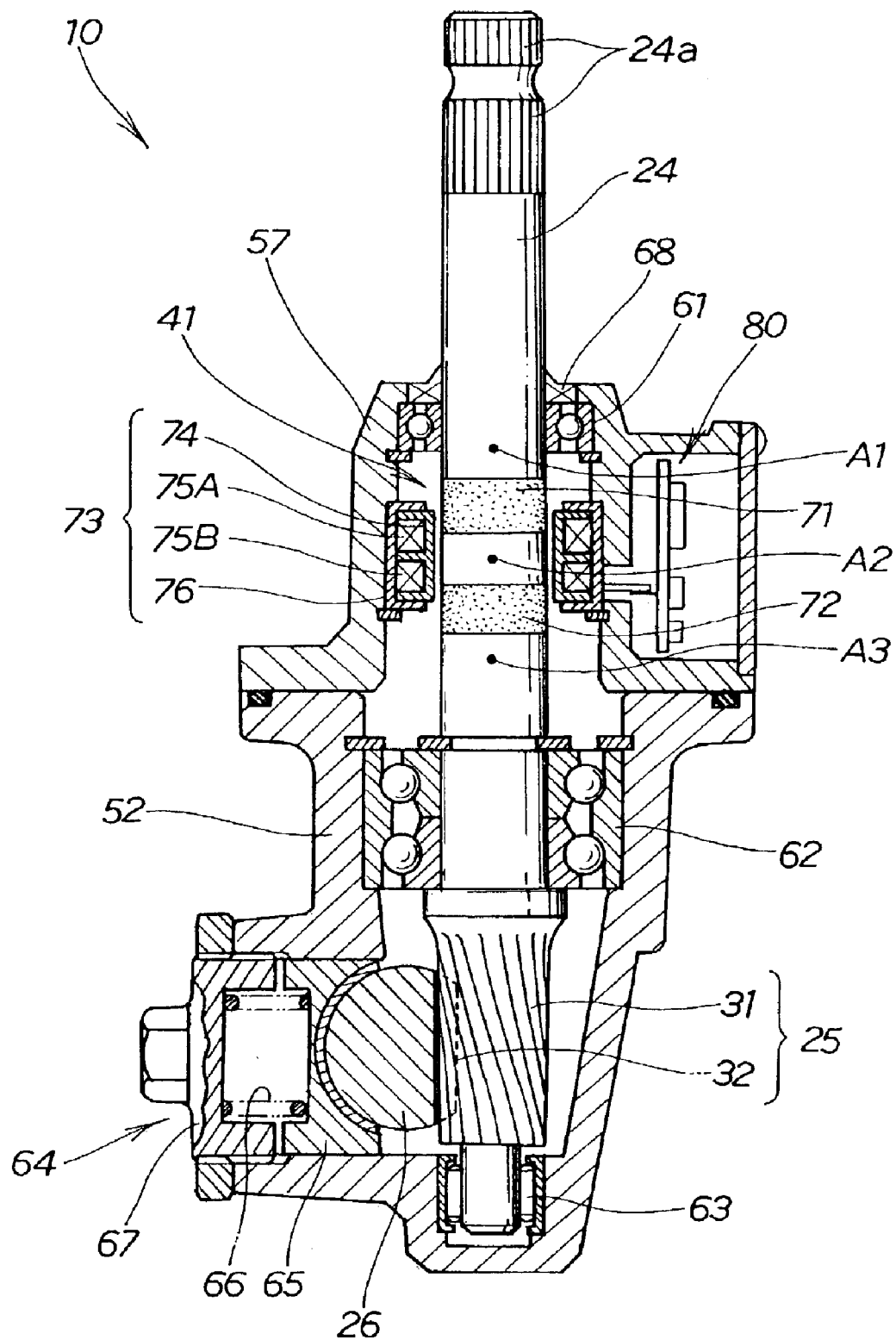
FIG. 3 is a sectional view on the line 3—3 in FIG. 2.

As shown in FIG. 3, the first housing 52 receives the torque detecting device 41, the pinion shaft 24 and the rack and pinion mechanism 25. A top opening in the first housing 52 is closed by a top cover part 57.

The first housing 52 rotatably supports an upper part, a longitudinally central part and the lower end of the pinion shaft 24, which extends up-down, with three bearings 61, 62 and 63. A rack guide 64 is provided in the first housing 52.

The pinion shaft 24 is an intermediate shaft and has at one end a spline joint part 24a or a serration joint part 24a for connecting it to one of the universal joints 23 shown in FIG. 1 and has at the other end the pinion 31.

The rack guide 64 has a guide part 65 for contacting the opposite side of the rack shaft 26 from that on which the rack 32 is formed; an adjusting bolt 67; and a compression spring 66 interposed in a gap between the guide part 65 and the adjusting bolt 67. The rack 32 on the rack shaft 26 is urged against the pinion 31 at all times by the compression spring 66. This rack guide 64 is a sliding guide mechanism. In the figure, the reference numeral 68 denotes an oil seal.

The torque detecting device 41 is a detecting device which detects an amount of twisting of the pinion shaft 24, which deforms in correspondence with the steering torque, and converts this into a steering torque. That is, the torque detecting device 41 is a magnetostriction type detecting device which electrically detects a magnetostriction effect which changes in correspondence with the amount of twisting of the pinion shaft 24.

The torque detecting device 41 will now be described in detail, with reference to FIG. 3 and FIG. 4.

The torque detecting device 41 is a steering torque sensor wherein two magnetostriction films (a first magnetostriction film 71 and a second magnetostriction film 72) are provided a distance apart in the axial length direction on the surface of the pinion shaft 24 as shown in FIG. 3; a detecting part 73 for electrically detecting a magnetostriction effect arising in these first and second magnetostriction films 71, 72 is provided around the first and second magnetostriction films 71, 72; and a detection signal of the detecting part 73 is processed by an output circuit part 80 and outputted as a torque detection signal.

The first and second magnetostriction films 71, 72 consist of plating layers of a constant thickness provided extending all the way around the pinion shaft 24 with a constant width. These plating layers are made from a material which shows a large change in magnetic flux density with respect to a change in strain, and for example are Ni—Fe alloy films formed by vapor plating on the outer circumferential face of the pinion shaft 24. Plating layers like these are thin films whose magnetostriction characteristics change in correspondence with the steering torque, and are given a permanent set in the circumference direction of the pinion shaft 24.

To give the first and second magnetostriction films 71, 72 a permanent set, for example the following method can be used.

(1) Set a point A1, a point A2 and a point A3 a fixed distance apart on the pinion shaft 24 in this order.

(2) Next, by fixing the point A1 and the point A3 and twisting the middle point A2, apply an excessive torque to the pinion shaft 24.

(3) Next, form first and second magnetostriction films 71, 72 consisting of plating layers by plating between the point A1 and the point A2 and between the point A2 and the point A3 on the outer circumferential surface of the pinion shaft 24 in this twisted state.

(4) Next, remove the torque and thereby return the pinion shaft 24 from the twisted state to its original state to complete the operation.

In this way it is possible to give the first and second magnetostriction films 71, 72 permanent sets in mutually opposite directions.

The detecting part 73 is provided so as to surround the first and second magnetostriction films 71, 72. This detecting part 73 is made up of a cylindrical coil bobbin 74 having the pinion shaft 24 passing through it; a first multi-layer solenoidal coil 75A and a second multi-layer solenoidal coil 75B wound on the coil bobbin 74; and a back yoke for magnetic shielding 76, surrounding the first and second multi-layer solenoidal coils 75A, 75B.

Hereinafter, the first multi-layer solenoidal coil 75A will be called 'the first coil 75A' and the second multi-layer solenoid coil 75B will be called 'the second coil 75B'.

The first coil 75A is disposed within the magnetic circuit of the first magnetostriction film 71 with a very small air gap between it and the surface of the pinion shaft 24, as a result of which its impedance changes in correspondence with changes in magnetic permeability occurring when a steering torque acts on the first magnetostriction film 71.

The second coil 75B is disposed within the magnetic circuit of the second magnetostriction film 72 with a very small air gap between it and the surface of the pinion shaft 24, as a result of which its impedance changes in correspondence with changes in magnetic permeability occurring when a steering torque acts on the second magnetostriction film 72.

Figure 4:
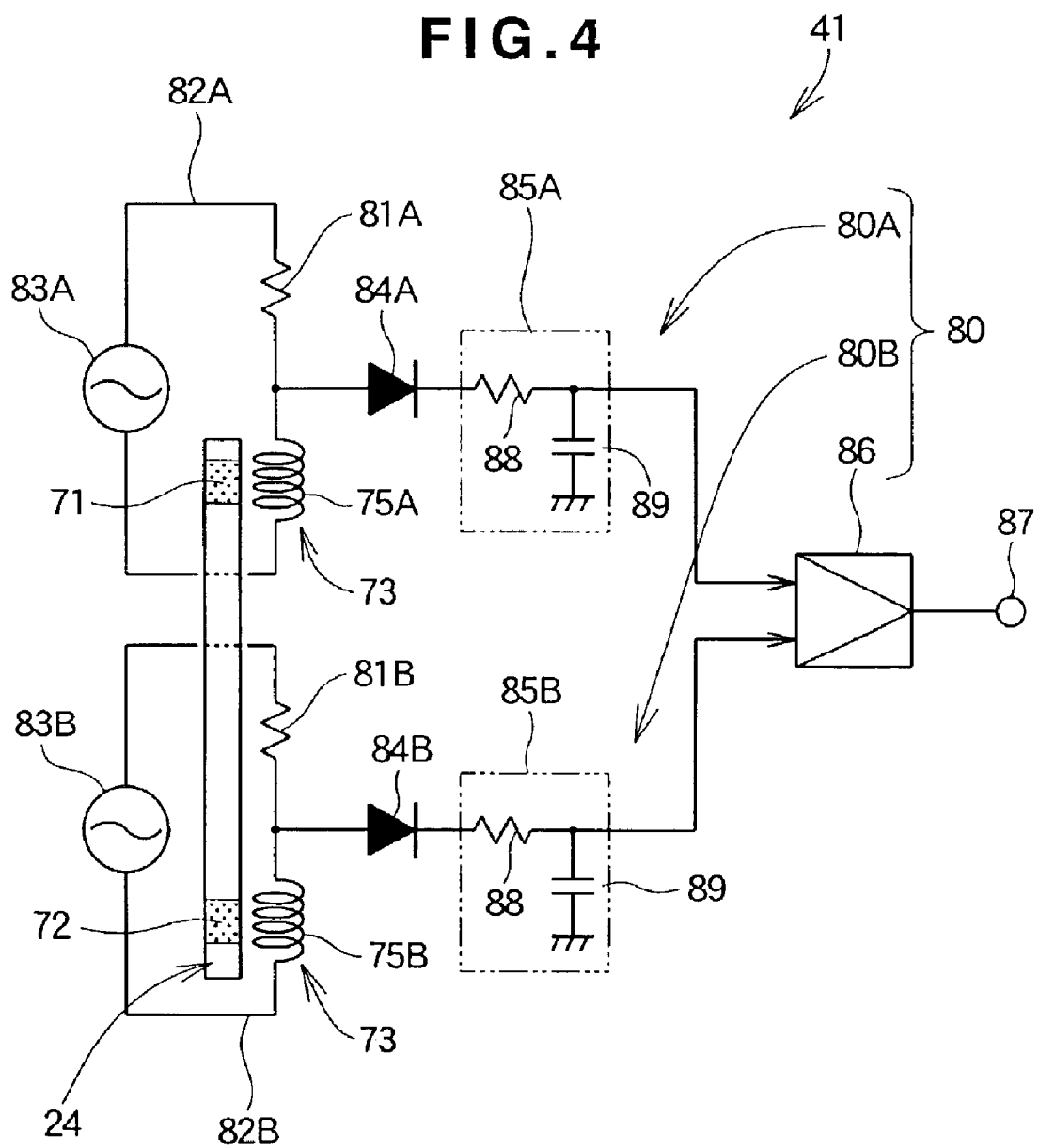
FIG. 4 is a circuit diagram of a torque detection device of the invention shown in FIG. 3.

FIG. 4 is an electrical circuit diagram of the torque detecting device 41 shown in FIG. 3. An output circuit part 80 of this torque detecting device 41 has a first circuit part 80A, a second circuit part 80B, and an amplifier 86.

The first circuit part 80A applies an alternating voltage from an alternating voltage supply 83A to a series circuit 82A consisting of the first coil 75A and a fixed resistance value resistance 81A connected in series to convert change of the impedance of the first coil 75A into an alternating voltage; takes this out as a first detection signal of the detecting part 73; rectifies this alternating voltage detection signal with a diode 84A and converts it into a low-noise d.c. voltage detection signal with a low pass filter 85A; and outputs this d.c. voltage detection signal to the amplifier 86.

The second circuit part 80B, which has the same construction as the first circuit part 80A, applies an alternating voltage from an alternating voltage supply 83B to a series circuit 82B consisting of the second coil 75B and a fixed resistance value resistance 81B connected in series to convert change of the impedance of the second coil 75B into an alternating voltage; takes this out as a second detection signal of the detecting part 73; rectifies this alternating voltage detection signal with a diode 84B and converts it into a low-noise d.c. voltage detection signal with a low pass filter 85B; and outputs this d.c. voltage detection signal to the amplifier 86.

The amplifier 86 amplifies the difference between the detection signals from the first circuit part 80A and the second circuit part 80B and outputs a torque detection signal from an output terminal 87. The circuits obtained by connecting the diodes 84A, 84B to the series circuits 82A, 82B are rectifying circuits. The low pass filters 85A, 85B are smoothing circuits each made up of a resistance 88 and a capacitor 89.

By using the first and second magnetostriction films 71, 72 given a permanent set as described above, a magnetostriction effect arising in the first magnetostriction film 71 is detected by the first coil 75A and a magnetostriction effect arising in the second magnetostriction film 72 is detected by the second coil 75B, and the direction and size of the steering torque acting on the pinion shaft 24 is thereby detected.

That is, in correspondence with the steering torque acting on the pinion shaft 24 the magnetic permeabilities of the first and second magnetostriction films 71, 72 change, and by changes of impedance in the first and second coils 75A, 75B at this time being detected with the output circuit part 80, the direction and torque value of the steering torque are detected.

Figure 5:
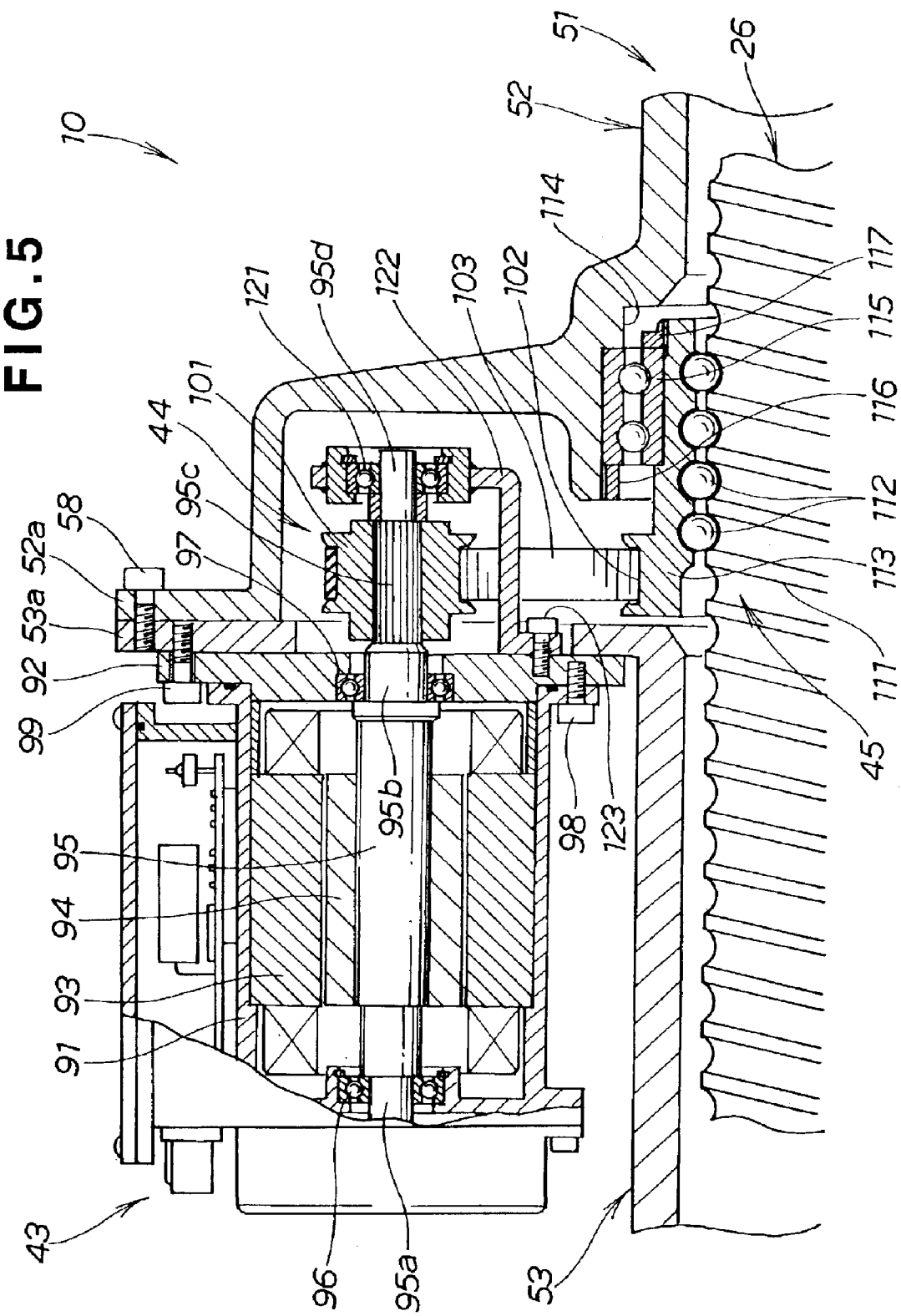
FIG. 5 is an enlarged sectional view of a housing, a rack shaft, an electric motor, a belt type transmission mechanism and a ball screw according to the invention.

FIG. 5 shows details of the construction of the electric motor 43, the belt type transmission mechanism 44 and the ball screw 45 shown in FIG. 2.

A flange 52a at one end of the first housing 52 and a flange 53a at one end of the second housing 53 are joined with bolts 58.

The electric motor 43 is an inner rotor type d.c. brushless motor, made up of a motor case 91, a lid 92 covering an opening in the motor case 91, a cylindrical outer stator 93 fitted in the motor case 91, an inner rotor 94 disposed inside the outer stator 93, and a motor shaft 95 integral with the inner rotor 94.

The motor shaft 95 is disposed parallel with the rack shaft 26. The shaft end 95a at the opposite end to the output side end of this motor shaft 95 is rotatably supported on the motor case 91 by a first bearing 96. An intermediate shaft part 95b part-way along the length of the motor shaft 95 is rotatably supported on the lid 92 by a second bearing 97. An extension part extending outward from the lid 92 (rightward in FIG. 5) is an output shaft part 95c of the motor shaft 95. Movement of this motor shaft 95 in its axial direction is limited by the first bearing 96 and the second bearing 97. The first and second bearings 96, 97 are roller bearings such as ball bearings. The lid 92 is fixed to the motor case 91 with bolts 98.

The belt type transmission mechanism 44 is made up of a small driving pulley 101 fixed to the motor shaft 95, a large following pulley 102 formed integrally with or fixed to a nut 113 of the ball screw 45, and a belt 103 passing around these driving and following pulleys 101, 102. This belt type transmission mechanism 44 is a speed-reducing mechanism, that is, a torque-increasing mechanism, for increasing torque by speed-reducing the rotation of the electric motor 43 while transmitting it to the ball screw 45.

The ball screw 45 is a ball nut mechanism, made up of a screw part (screw groove) 111 formed on the rack shaft 26; multiple balls 112; and the nut 113 constituting an outer cylindrical portion, which is fitted on the screw part 111 with the balls 112 therebetween.

This ball screw 45 is for transmitting the assisting torque of the electric motor 43 from the nut 113 to the screw part 111 through the balls 112, and has a so-called internal circulation type or external circulation type construction wherein balls 112 having reached the end of the screw groove in the nut 113 recirculate through a tube (not shown).

The first housing 52 has a ball screw receiving part 114 formed integrally with one end thereof. The nut 113 has movement thereof in the axial direction with respect to the first housing 52 limited by and is rotatably supported by this ball screw receiving part 114 by way of a bearing 115. The bearing 115 is a roller bearing. The reference numerals 116 and 117 denote locking screws.

An assisting torque produced by the drive of the electric motor 43 is transmitted to the rack shaft 26 along the route of motor shaft 95→driving pulley 101→belt 103→following pulley 102→nut 113→balls 112→screw part 111. In this way, the assisting torque is converted into thrust (axial force on the rack shaft 26) and applied to the rack shaft 26.

This invention has it as a characteristic that the motor shaft 95 is rotatably supported on both sides of the position where the driving pulley 101 is fixed.

Specifically, the driving pulley 101 is fixed to the output shaft part 95c of the motor shaft 95. The end part 95d of the output shaft part 95c is rotatably supported by way of a third bearing 121 by a bracket 122. This bracket 122 is fixed to the lid 92 with bolts 123. In this way, the motor shaft 95 is rotatably supported at positions on both sides of the driving pulley 101 by the second bearing 97 and the third bearing 121. The third bearing 121 is a roller bearing such as a ball bearing.

Of the motor shaft 95, the part rotatably supported on both sides of the driving pulley 101, i.e. the output shaft part 95c of the motor shaft 95, has bending rigidity equal to that of when both its ends are supported. By the motor shaft 95 being made straddle-supported like this, its bending rigidity is raised to above that of a cantilever type motor shaft of related art. As a result, even when the motor shaft 95 is subjected to a large bending load, the amount of bending of the motor shaft 95 is greatly reduced. By bending of the motor shaft 95 being suppressed like this, leaning of the belt 103 with respect to the driving pulley 101 is suppressed, and the torque transmission efficiency can be raised. Consequently, even when the fluctuation of the assisting torque is large, irregularities do not readily arise in the assisting torque applied to the rack shaft 26 of the steering mechanism from the electric motor 43 by way of the belt type transmission mechanism 44 and the ball screw 45. And accordingly, the steering feel of the electric power steering apparatus 10 can be improved.

The flange 53a at one end of the second housing 53 is fixed to the lid 92 with bolts 99, and the electric motor 43 is thereby mounted to the housing 51.

In this way, the bracket 122 for supporting the end part 95d of the motor shaft 95 is fixed to the electric motor 43. Accordingly, when the bolts 99 are loosened and the electric motor 43 is displaced with respect to the housing 51 to adjust the tension of the belt 103, the bracket 122 and the third bearing 121 can also be displaced at the same time, and the adjustment work becomes easy.

Figure 6:
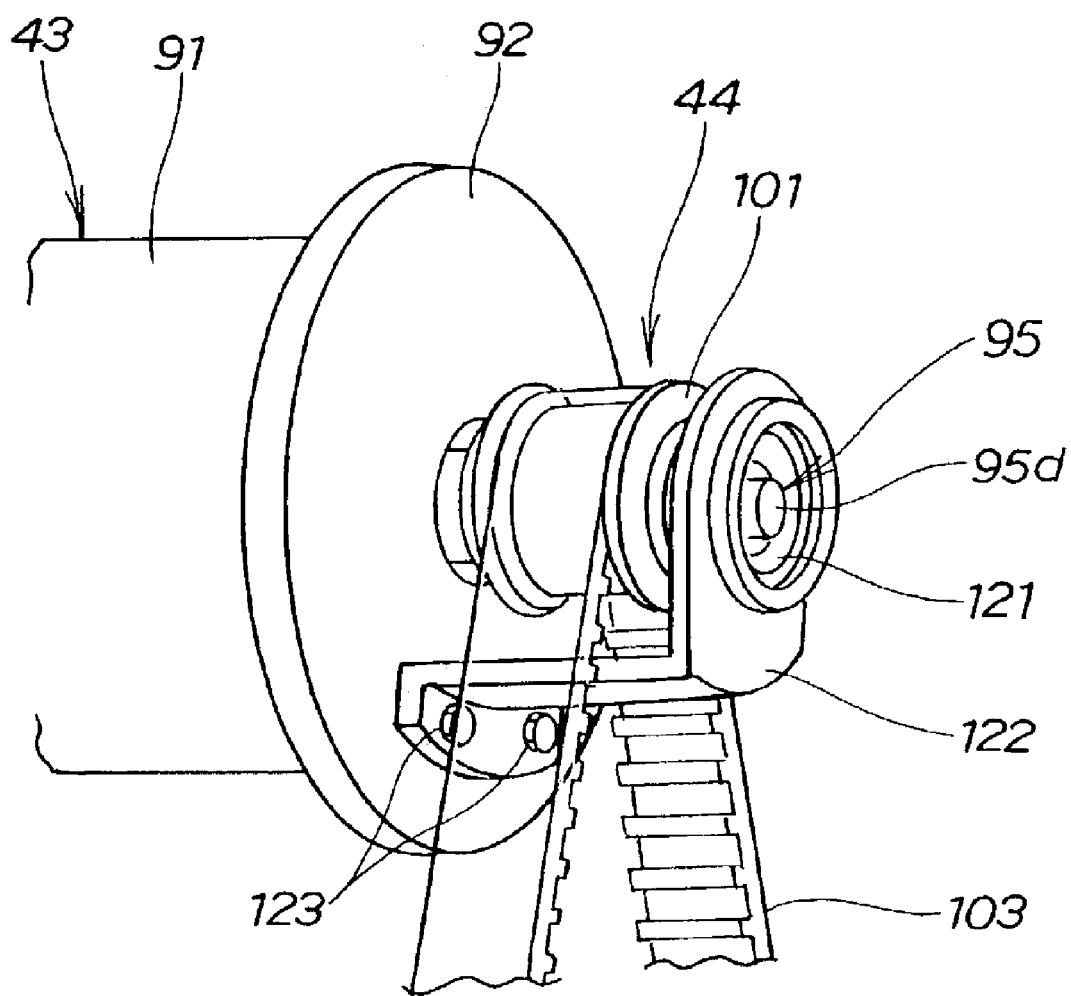
FIG. 6 is a perspective view of the belt type transmission mechanism shown in FIG. 5.

As shown in FIG. 6, the bracket 122 mounted on the lid 92 of the electric motor 43 passes through the loop of the belt 103 and has in its distal end the third bearing 121 for rotatably supporting the end part 95d of the motor shaft 95.

The operation of an electric power steering apparatus 10 constructed like this will now be explained, on the basis of FIG. 3.

Because the amount of twisting of the pinion shaft 24, which changes with the steering torque, is detected and converted into a steering torque by the torque detecting device 41, the pinion shaft 24 can be made a single shaft, not divided into a torque input side and a torque output side. When it is made a single shaft like this, the amount of twist occurring when a steering torque acts is extremely small. Consequently, the delay of the operation timing of the steering road wheels with respect to the steering timing of the steering wheel is greatly suppressed. Furthermore, since an extremely small amount of twist is detected by the torque detecting device 41, it can be detected rapidly. As a result, the electric motor 43 shown in FIG. 1 produces the assisting torque swiftly and the responsiveness of the electric power steering apparatus 10 for providing an assisting torque corresponding to the steering torque can be raised. Because of this, the steering feel can be improved.

Also, because the torque detecting device 41 is made a magnetostriction type detecting device which electrically detects a magnetostriction effect changing in correspondence with the amount of twist of the pinion shaft 24, the magnetostriction effect changing in correspondence with an amount of twist can be detected rapidly and certainly by the magnetostriction type detecting device. Therefore, the responsiveness of the electric power steering apparatus 10 for providing an assisting torque corresponding to the steering torque can be raised further. Because of this, the steering feel can be improved further.

Also, because magnetostriction films 71, 72 are provided on the surface of the pinion shaft 24 extending all the way around its circumference with a predetermined width and a magnetostriction type detecting device for detecting the magnetostriction effect of these magnetostriction films 71, 72 with a detecting part 73 is used as the torque detecting device 41, there is no particular limit on the material of the pinion shaft 24. Consequently, a material with high mechanical strength can be used as the pinion shaft 24.

In the preferred embodiment of the invention described above, the electric power steering apparatus 10 can be any construction for additionally applying an assisting torque to a steering mechanism 20 by way of a belt type transmission mechanism 44, and besides a construction wherein the assisting torque is applied to the rack shaft 26, alternatively it may be one wherein the assisting torque is applied to the pinion shaft 24.

Also, the electric motor 43 may alternatively be a construction having a speed-reducing mechanism. The motor shaft 95 in this case can be considered as the output shaft of the speed-reducing mechanism.

What is claimed is:

1. An electric power steering apparatus for use in an automotive vehicle, comprising:

a steering wheel;

a steering system including a pinion shaft connected to the steering wheel and a rack shaft connected to steerable road wheels of the vehicle;

a rack and pinion mechanism having a pinion formed on the pinion shaft and a rack formed on the rack shaft;

an electric motor for producing an assisting torque corresponding to a steering torque produced with the steering wheel, the electric motor having a motor shaft rotatable supported by a first bearing disposed at an end of the motor, the motor shaft including an output shaft part projecting outward from the end of the motor;

a belt transmission mechanism for transmitting the assisting torque from the electric motor to the rack shaft of the rack and pinion mechanism, the belt transmission mechanism having a driving pulley fixed to the output shaft part of the motor shaft, a driven pulley operatively coupled with the rack shaft, and an endless belt trained around the driving and driven pulleys; and a bracket connected to the electric motor and extending outward from the end of the electric motor through a loop of the endless belt, the bracket having a distal end part disposed outward of the driving pulley and rotatably supporting thereon a second bearing, wherein the output shaft of the motor shaft has an end part disposed outward of the driving pulley and is rotatably supported by the second bearing so that the output shaft part of the motor shaft is rotatably supported at positions on both sides of the driving pulley.

2. An electric power steering apparatus for use in an automotive vehicle, comprising:

a steering wheel;

a steering system including a pinion shaft connected to the steering wheel and a rack shaft connected to steerable road wheels of the vehicle, the pinion shaft being a single one-piece shaft;

a rack and pinion mechanism having a pinion formed on the pinion shaft and a rack formed on the rack shaft;

a torque detection device for detecting a steering torque created in the single one-piece pinion shaft when the steering wheel is turned to steer the steerable road wheels;

an electric motor for producing an assisting torque corresponding to a steering torque created in the single one-piece shaft when the steering wheel is turned to steer the steerable road wheels, said electric motor having an output shaft;

a belt transmission mechanism interposed between the electric motor and the rack and pinion mechanism for transmitting the assisting torque to the rack shaft of the steering system; and a bracket connected to the electric motor and having a distal end part disposed outward from the electric motor and the belt transmission mechanism, said distal end part of said bracket supporting a bearing, said bearing supporting the output shaft of the electric motor;

wherein the torque detection device detects an amount of twist of the single one-piece pinion shaft which changes in correspondence with the steering torque and converts the detected amount of twist into a corresponding steering torque.

3. An electric power steering apparatus according to claim 2, wherein the torque detection device is a magnetostriction detection device for electrically detecting a magnetostriction effect which changes in correspondence with the amount of twist of the single one-piece pinion shaft.

\* \* \* \* \*